C. FERENBACH.
SKEIN LACING MACHINE.
APPLICATION FILED OCT. 29, 1908.
916,690.
Patented Mar. 30, 1909.
7 SHEETS—SHEET 2.
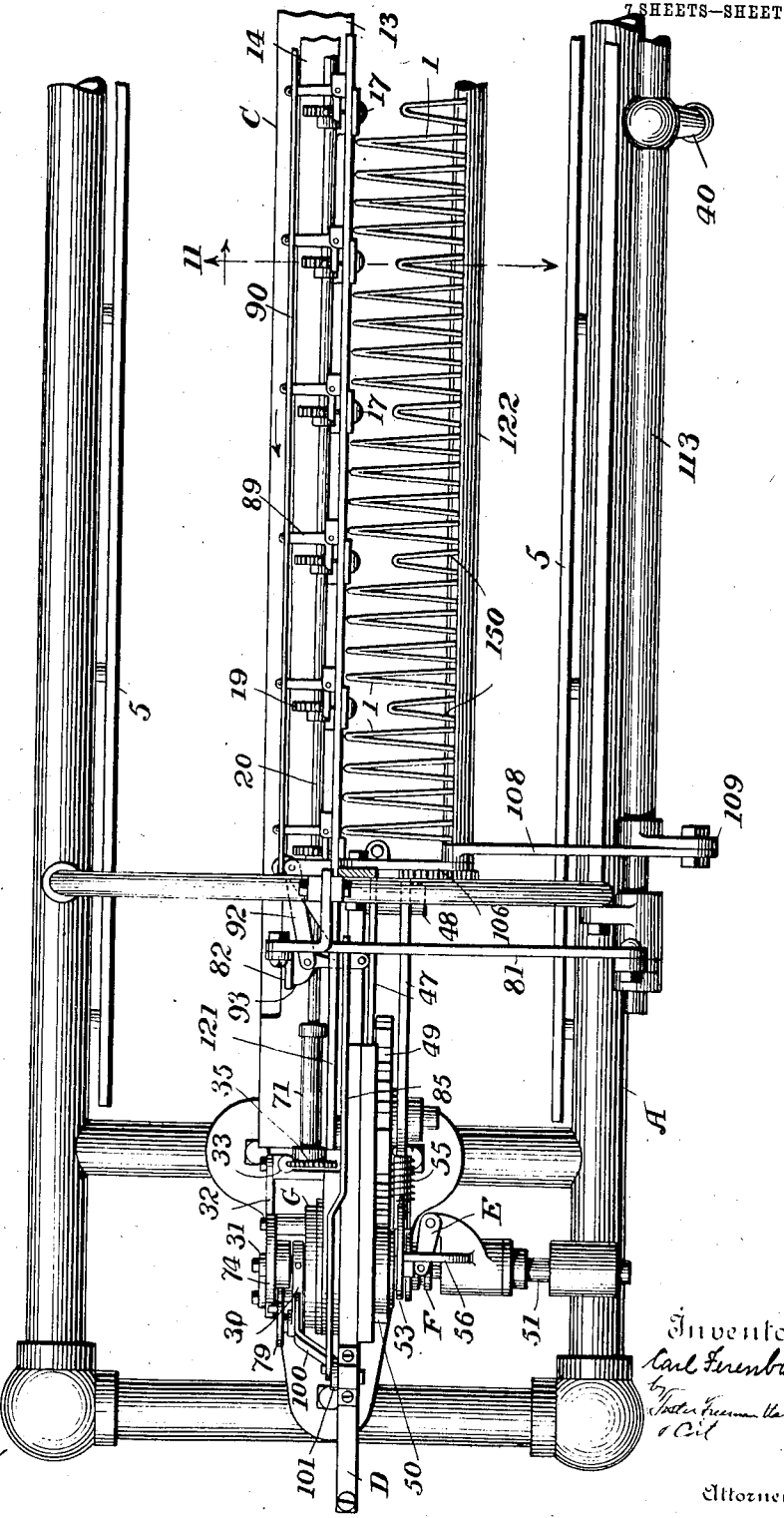

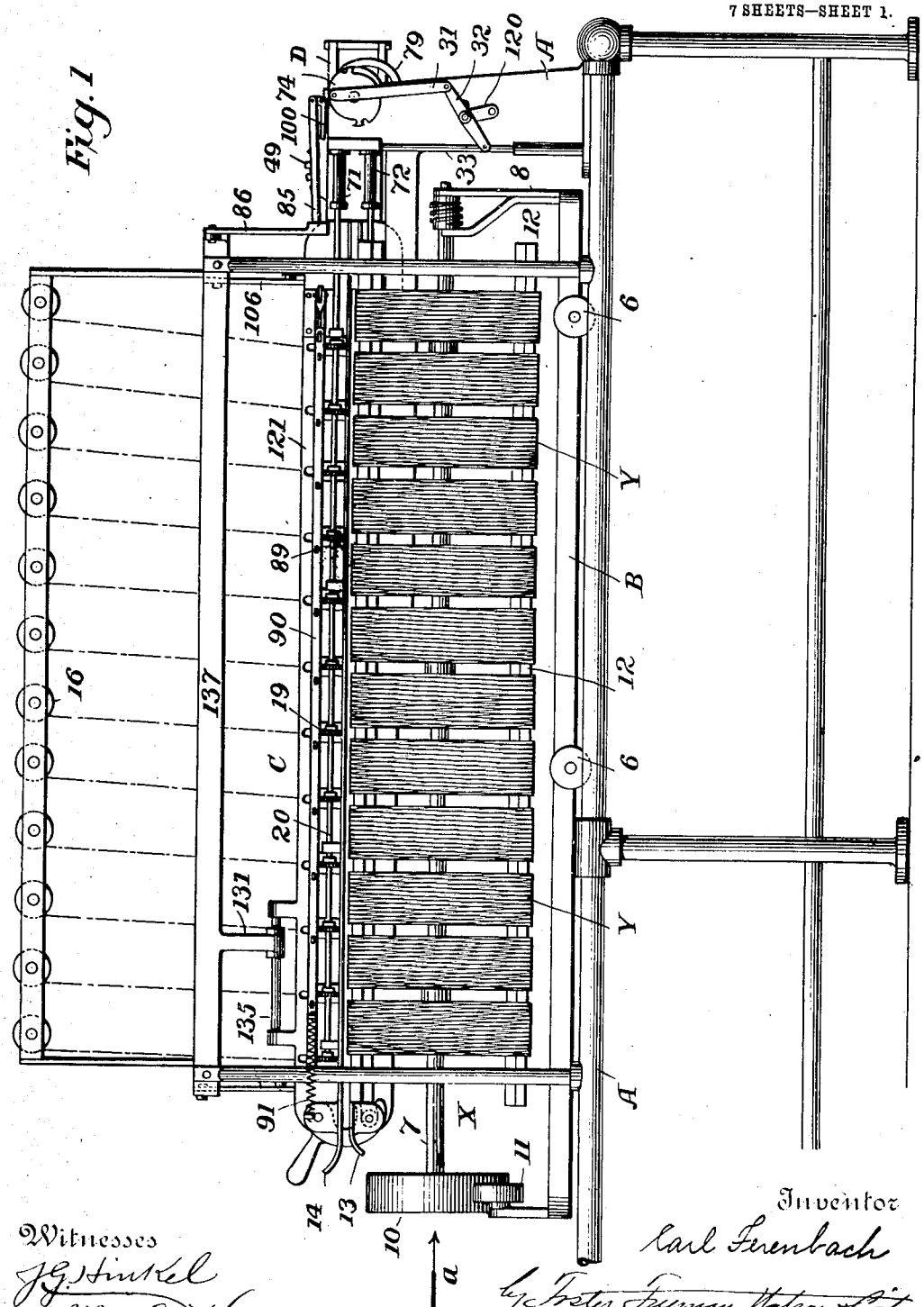

C. FERENBACH.
SKEIN LACING MACHINE.
APPLICATION FILED OCT. 29, 1908.
916,690.
Patented Mar. 30, 1909.
7 SHEETS—SHEET 3.
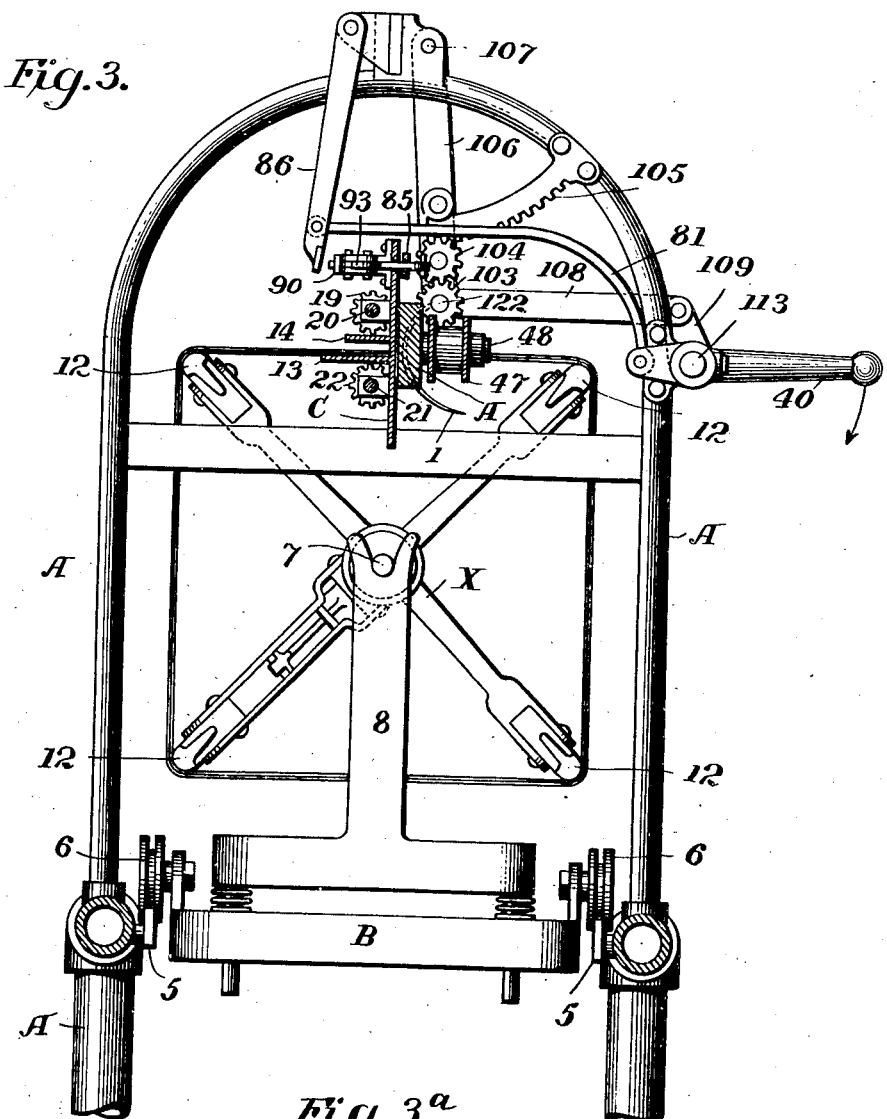
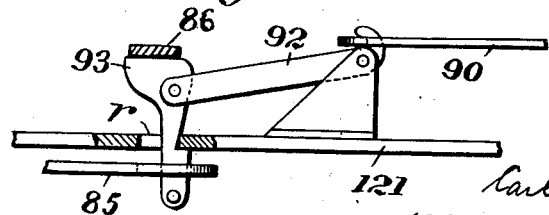
Witnesses
Inventor
Carl Ferenbach
Attorneys

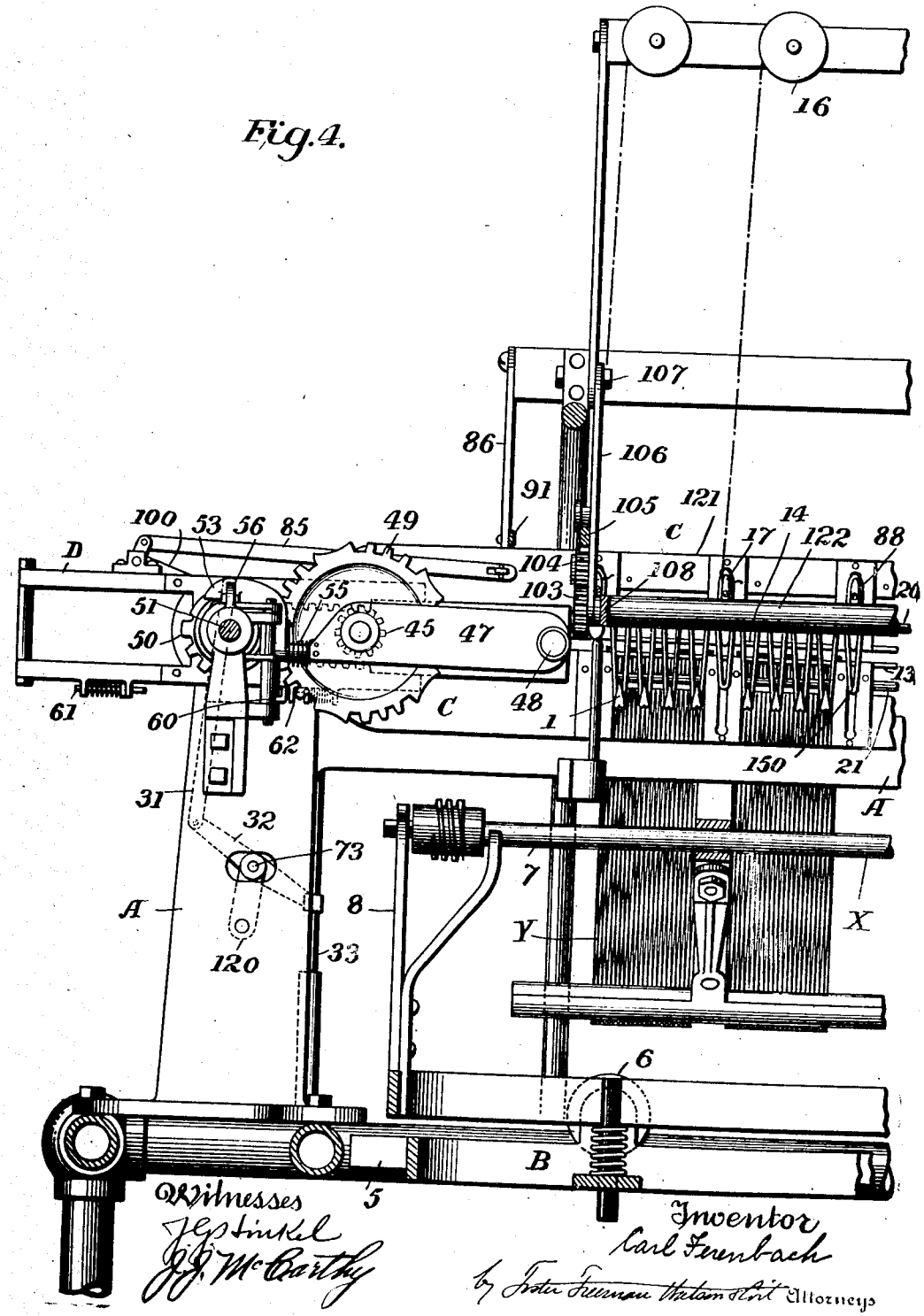

C. FERENBACH.
SKEIN LACING MACHINE.
APPLICATION FILED OCT. 29, 1908.
916,690.
Patented Mar. 30, 1909.
7 SHEETS—SHEET 5.
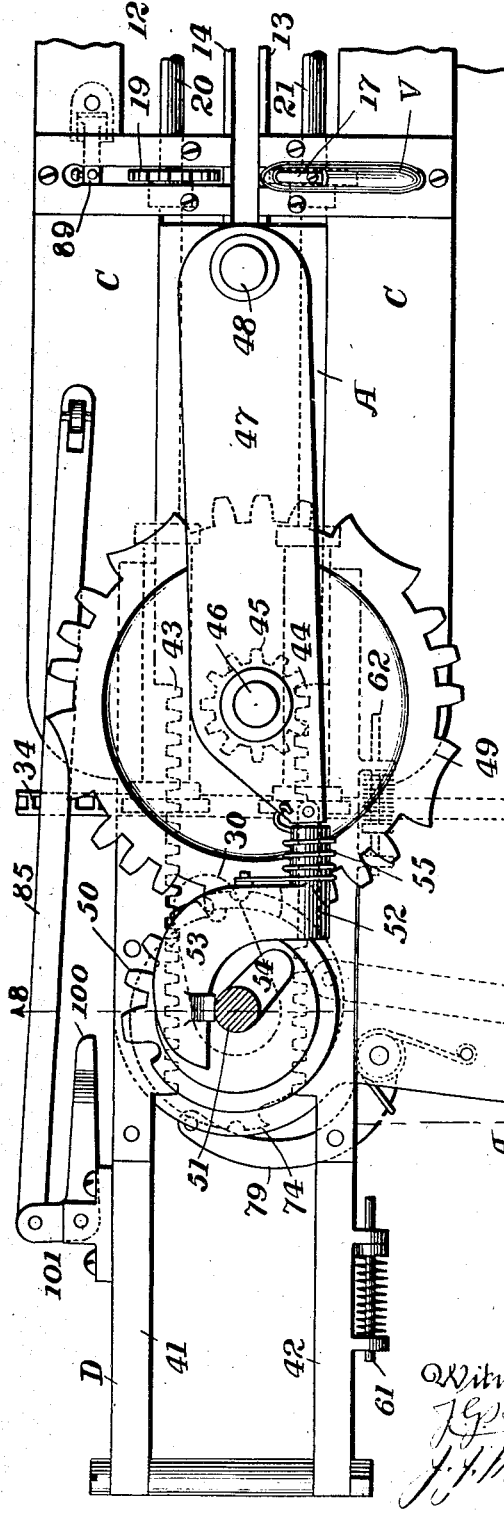
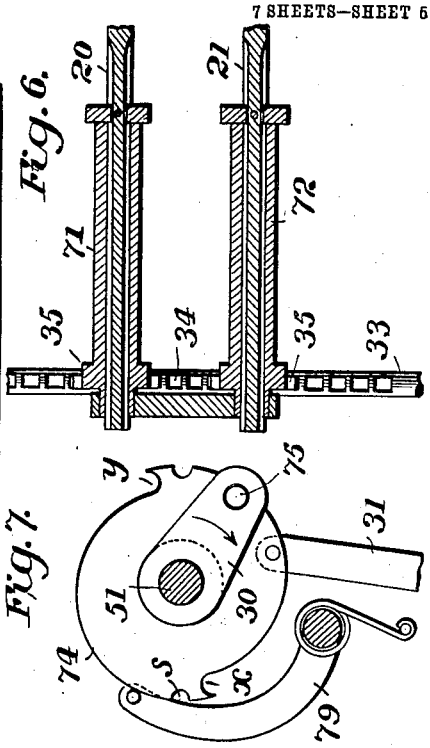
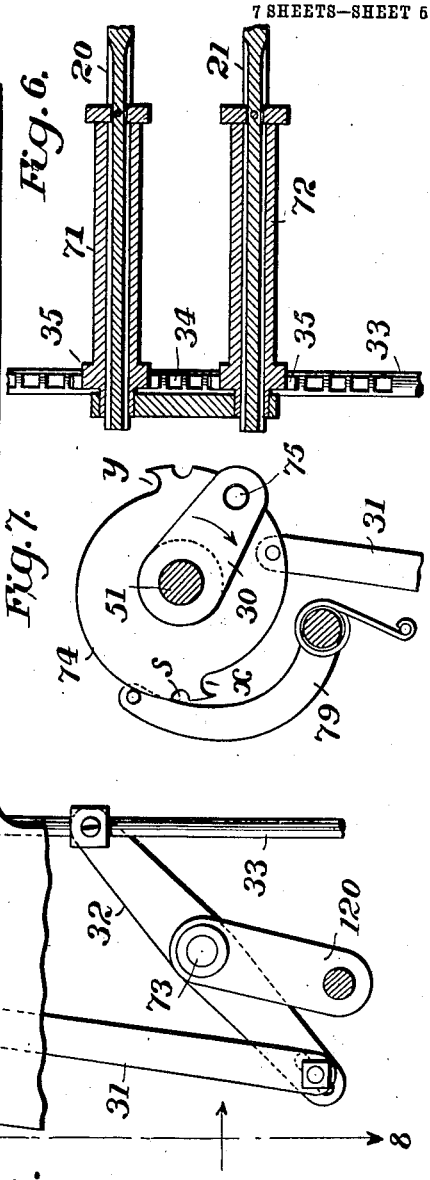
Witnesses
J. G. Hinkel
J. F. McCarthy
Inventor
Carl Ferenbach
by Foster Freeman Watson &c
Attorneys

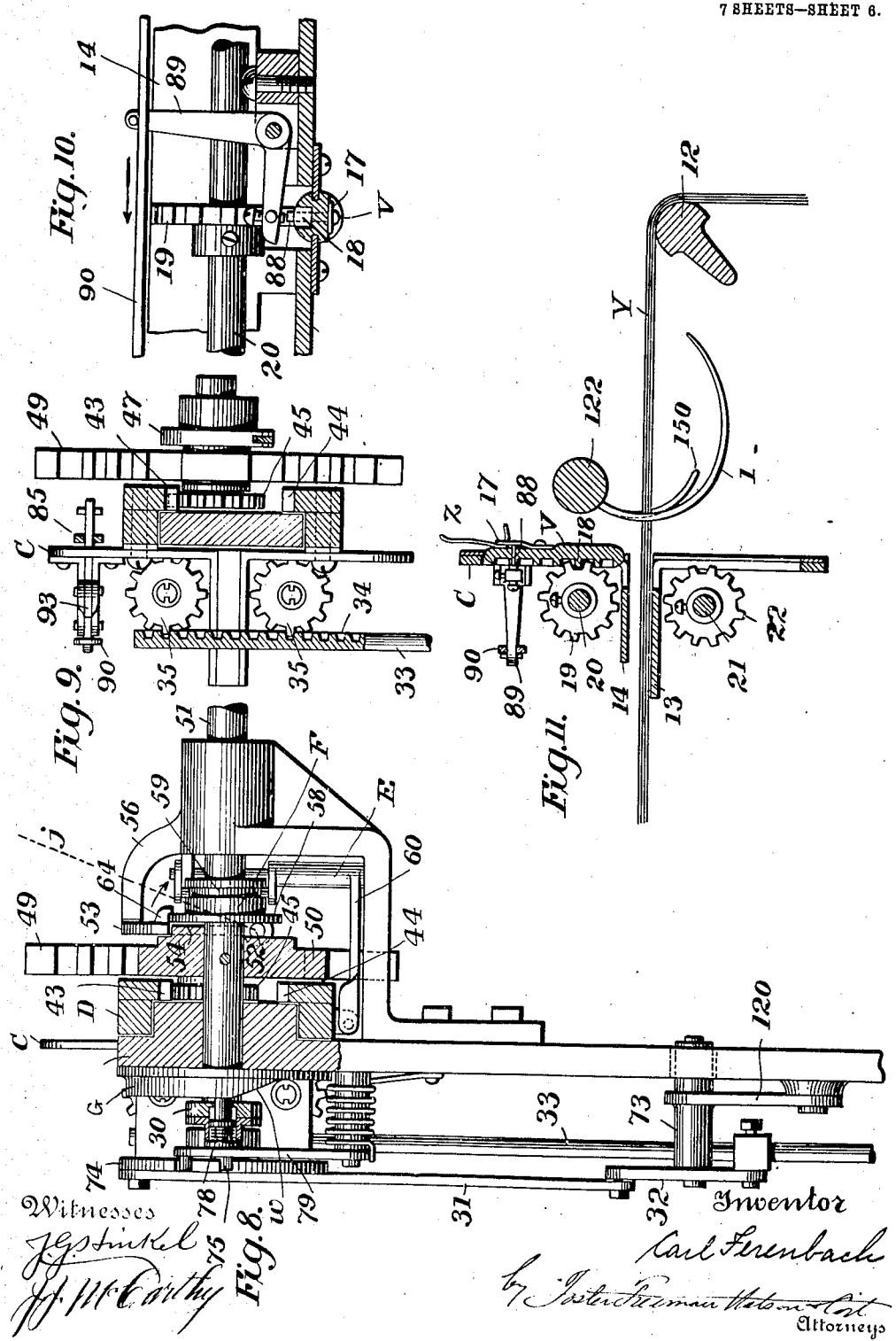

C. FERENBACH.
SKEIN LACING MACHINE.
APPLICATION FILED OCT. 29, 1908.
916,690.
Patented Mar. 30, 1909.
7 SHEETS—SHEET 7.
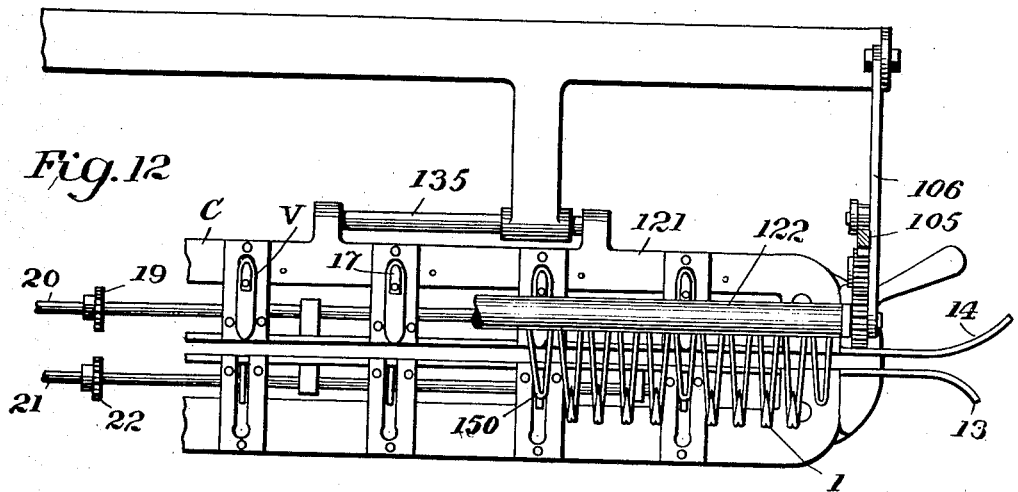
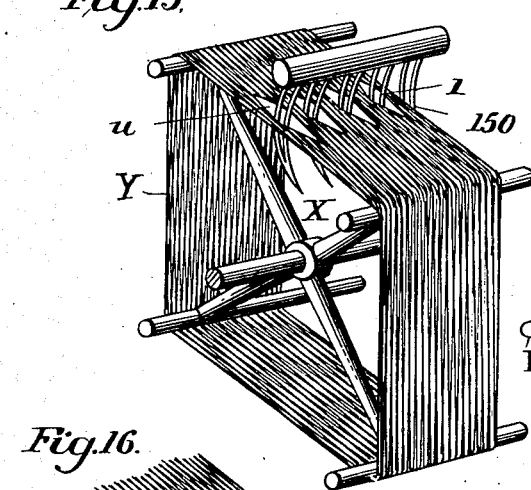
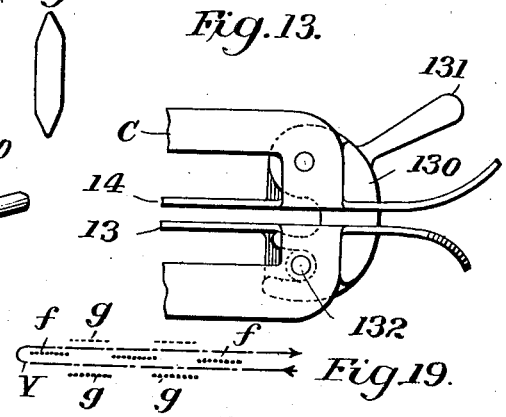
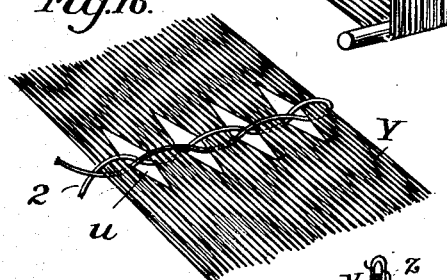
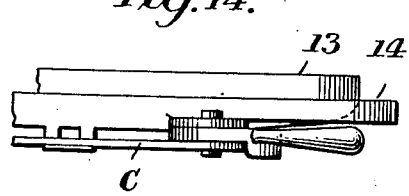
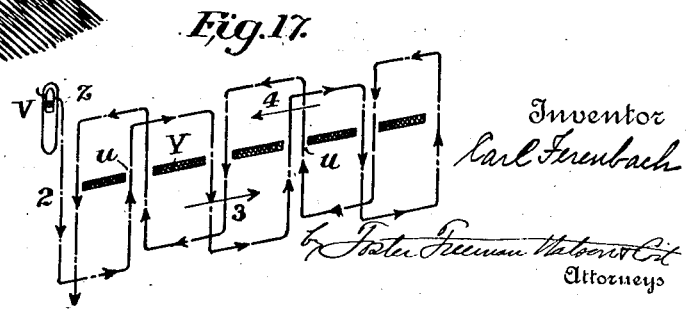

UNITED STATES PATENT OFFICE.

CARL FERENBACH, OF WILKES-BARRE, PENNSYLVANIA.

SKEIN-LACING MACHINE.

No. 916,690.　　　　Specification of Letters Patent.　　　Patented March 30, 1909.

Application filed October 29, 1908. Serial No. 460,136.

*To all whom it may concern:*

Be it known that I, CARL FERENBACH, a citizen of the United States, and resident of Wilkes-Barre, Pennsylvania, have invented certain new and useful Skein-Lacing Machines, of which the following is a specification.

My invention relates to the "lacing" of skeins or hanks of threads or yarns of various kinds, and consists in certain apparatus whereby a lacing thread is carried across a distended skein above some portions and below the others, and back in a reverse direction, as fully set forth hereinafter and as illustrated in the accompanying drawings, in which:

Figure 1 is a side elevation illustrating the apparatus as constructed to simultaneously lay a dozen skeins; Fig. 2 is a plan view at one end of the apparatus, enlarged and in part section; Fig. 3 is a transverse sectional elevation of the main part of the apparatus; Fig. 3ª is an enlarged plan view of part of the thread detaching appliances; Fig. 4 is a longitudinal sectional elevation mainly of the parts shown in Fig. 2; Fig. 5 is an enlarged side elevation showing the main driving appliances; Fig. 6 is a longitudinal section of the driving parts connected with the shafts for driving the thread carriers; Fig. 7 is a detached view of part of the driving devices; Fig. 8 is a transverse section on the line 8—8 Fig. 5; Fig. 9 is a section on the transverse plane of the rack rod 33, Fig. 5; Fig. 10 is an enlarged plan view illustrating the devices for releasing the threads from the thread carriers; Fig. 11 is a transverse section, enlarged, on the line 11 Fig. 2; Fig. 12 is a plan of part of the devices at the entrance end of the apparatus; Fig. 13 a detached plan showing one end of the thread carrier frame; Fig. 14 a view of the parts shown in Fig. 13; Figs. 15, 16 and 17 diagrammatic views illustrating the operations in lacing a distended skein at one side thereof; Fig. 18 a view showing a modified form of thread carrier; Fig. 19 a diagrammatic view illustrating a different means of distending the yarn for the passage of the carrier.

Before specifying the details of the particular apparatus illustrated for carrying out my invention I refer to the diagrams Figs. 15 to 17. Fig. 15 represents in perspective a hank Y or skein of yarn, silk or other material to be dyed, as mounted on a rotatable reel X and thus occupying a quadrangular position. The threads or fibers at the upper side of the quadrangle are now penetrated by a suitable number of distending horns 1, which thus separate them at the points of penetration. A shuttle or carrier V, Fig. 17, carrying a lacing thread $z$ now descends past one edge of the material to a position below the same, as indicated by the line 2, Fig. 17. The carrier is then moved laterally one step in the direction of the arrow 3 until it is below the opening $u$ made by the horn next the edge of the material. The carrier then rises through said opening, after which it moves another step in the direction of the arrow 3 and until above the next opening, when the carrier descends, and so on, the carrier rising, descending and shifting alternately until the thread is carried by the ascent of the carrier past the opposite edge of the material, to a position above the same. The carrier is then moved one step in the direction of the arrow 4 until above the opening next the edge of the material, when the carrier drops and moves another step laterally, and so on until the thread has completed the series of movements indicated by the dotted lines and arrows Fig. 17. After the thread has been carried to the edge of the material where the operations began it occupies the laced position shown in Fig. 16, and is cut and the two lower ends are tied together. The reel is then turned quarter around and the like operations may be performed at one or more of the other sides of the quadrangle. The reel may of course be constructed to present the skein with any desired number of sides, and many different constructions may be employed to separate the yarns or fibers of the mass, to guide and move the carrier, and to shift the carriers or skeins laterally, but the constructions shown in the drawings and which I will now describe have proved very effective.

The frame A of the apparatus is suitably constructed to support rails 5 Fig. 3, on which rest the wheels 6 of a reel carriage B, the reel being of a length to support any desired number of skeins. The shaft of the reel rests at one end in a notch in a standard 8 of the carriage, and at the other end, Fig. 1, the shaft carries a pulley 10 which has its bearing on separated antifriction rolls 11 on the carriage. The reel as shown is of the usual construction and consists of cross arms supporting four equidistant parallel bars or rods 12, 12. The hanks or skeins are placed on the reel in a separated position and the reel is then placed on its bearings on the carriage and the latter is moved into the frame to its proper position.

To properly support the material under the operations of the distenders and their carriers two parallel horizontal guard plates 13, 14 Figs. 3, 11 and 13, are so supported on a frame C on the main frame that as the carriage with the charged reel is moved inward on the main frame in the direction of the arrow a, Fig. 1, the upper side of the mass on the reel will pass between the plates 13, 14 to the position shown in Figs. 3 and 11. While the carriers may be in the form of shuttles, each carrying its own bobbin, I have shown the thread as carried by bobbins 16 supported by pins on the main frame and the threads attached at their ends to the carriers as by clips 17, Fig. 11. Each thread carrier has a rack 18 for engaging pinions 19, 22, on shafts 20, 21, above and below the guard blades 13, 14, and so arranged that the upper pinion will move its thread carrier downward through the material which is between said plates until the lower pinion also engages it, and the latter pinion then moves the carrier farther down and entirely below the material and after the longitudinal movement of the carrier, then carries the carrier up until it is engaged by the upper pinion which lifts it to its upper position wholly above the material. There is a thread carrier to each mass or skein on the reel, and the guard plates and vertical guides in which the thread carriers move and bearings for the shafts 13, 20, 21, constitute parts of or are on the sliding or shifting frame C, movable on the main frame step by step in one direction until each thread carrier has traversed the material in one direction, and then step by step back to its first position. The shaft of the distenders is rocked to withdraw the distenders after the thread carriers have completed their series of operations and the rocking is effected by hand from a shaft 113 as described hereinafter. The step-by-step movements of the thread carriers carrying each from a position opposite one opening in the material to a position opposite the next opening—results from the longitudinal movements of the thread carrier frame C. This frame is provided with an extension D Fig. 5, consisting of two connected parallel bars 41, 42, carrying racks 43, 44, between which is a pinion 45 supported on a short shaft 46 which turns in bearings on a tongue 47 pivoted at 48 to the frame C, and by swinging the tongue up or down the pinion 45 may be brought to engage one or other of the racks 43, 44. The shaft 46 also carries a toothed gear 49 adapted to a mutilated gear 50 on a driving shaft 51, the gears constructed as shown to correspond to a "Geneva stop" so that each rotation of the gear 50 will turn the gear 49 part of a rotation and then hold the latter gear stationary until the next rotation of the driving gear 50. As a result the pinion 45 (being in engagement with either rack) will feed the said rack and its connected frame intermittently in one direction, and on shifting the pinion into engagement with the other rack the frame will be fed intermittently in the opposite direction.

The shifting of the gear 45 results when the thread carriers have fully traveled the width of the skeins, and to this end the tongue 47 is provided with a pin 52 to receive the hub of a swinging bracket 53 Figs. 5 and 8, which extends over the driving shaft 51. On said shaft is a lifting cam 54 which when brought beneath the bracket 53 lifts the latter and the tongue 47 and carries the pinion 45 from mesh with the rack 44 into mesh with the rack 43, and a spring 55 connected with the tongue and with the bracket tends to swing the latter away from the cam 54 in the direction of the arrow Fig. 8, but so long as the bracket is elevated it cannot be so swung, because of its lateral contact with an arm 56 extending from the main frame. When, however, the bracket is lowered it is below said arm, and may then swing to the position indicated by the dotted line J, Fig. 8. As the lifting cam 54 is carried below the bracket at each rotation of the driving shaft, it is necessary to prevent the lowering of the bracket until the thread carriers have fully traversed the width of the skeins, and I therefore provide a movable detent F to hold the bracket in its upper position until the frame C has completed its movement in one direction, and to restore the bracket to position after the frame C has completed its movement in the other direction. This detent F is shown as a sleeve provided with an annular flange 58 and groove 59, the latter receiving the ends of the forked arm of a shipper E vertically pivoted in the main frame and having a lateral arm 60. On the extension frame D are two contact pins 61, 62 Fig. 5, (preferably having spring bearings to prevent shocks) and so arranged that as the frame C completes its inward movement the contact 61 will strike the arm 60 and swing the shipper E to carry the detent F to the right, Fig. 8, and permit the bracket to descend when the cam 54 is next removed therefrom. This brings the pinion 45 into mesh with the lower rack and reverses the movement of the frame C, and the latter moves outward until the contact 62 reverses the position of the shipper which carries the bracket to its vertical position, and when the bracket 53 is again lifted the shipper passes under the same and supports it in its elevated position.

The bracket is provided with a lateral arm 64, a lip on which engages the flange 58 and prevents the shipper from getting prematurely out of position.

The rotation or rocking of the shafts 20, 21 to carry the thread carriers up and down is effected by the vertical reciprocation of a rack 34 Figs. 6 and 9, which meshes with pinions 35, 35, on two hollow shafts or sleeves 71, 72 turning in fixed bearings of the main frame and into which hollow shafts the shafts 20, 21 extend and slide, the shafts being feathered so that each sleeve and shaft turn together, but the shafts 20, 21, can travel with the frame C on which they have their bearings. The rack 34 is on a rod 33, guided on the main frame, Fig. 5, and connected with one end of a rock lever 32, the other end of which is connected by a connecting rod 31 with a wrist pin on a disk 74 Figs. 7 and 8, carried loosely by the driving shaft 51. The fulcrum 73, is on an arm 120 pivoted to the main frame. As the thread carriers should be moved vertically in one direction, and then remain in the position to which they are thus moved until they have been carried laterally one step by the frame C, the rack rod 33 is shifted upward on one rotation of the driving shaft and then remains at rest until the next rotation, when it is shifted in the opposite direction. This is effected by the alternate engagement and disengagement of a sliding pin 75 Figs. 7 and 8, carried with the driving shaft and the disk 74. The pin 75 slides in an arm 30 on the shaft 51 and when in its inner position will engage one of two diagonally arranged shoulders or bearings $x$, $y$, of the disk 74, and in its outer position will escape said disk. Thus if the pin is pushed in as the arm 30 approaches the shoulder $x$, said pin will engage said shoulder and turn the disk until the pin is pushed out, which is at the end of a half rotation of the disk. This brings the shoulder $y$ to the position previously occupied by the shoulder $x$, and the pin is then again pushed in to engage the shoulder $y$ and again turn the disk a half rotation. Thus the disk, with its connected parts, are alternately moved and come to a rest. The shifting of the pin 75 is effected by a spring 78 (Fig. 8) moving the pin in one direction, and a cam G with which its spring keeps the inner end of the pin in contact, the cam having inclined faces $w$ which push out the pin and permit it to move back at the proper periods of the rotation. At the completion of each semi-rotation of the disk a notch $s$ in the same is brought opposite a pin of a spring dog 79 which holds the disk frictionally from rotation.

When the thread carriers are brought back to normal position, after the completion of the lacing operation, it is necessary to sever the thread between the bobbins and the reels (which is done by hand) and to release the ends clamped to the thread carriers (which is done automatically) and the two ends are then tied together. To provide for the release of the ends clamped to the thread carriers each thread carrier has a sliding pin 88, Figs. 10, 11, which extends through the carrier and bears at one end against the inside of the blade of the clamp 17, and to the frame C are pivoted bell crank levers 89, set screws of which are in position to strike the outer ends of the pins 88. An operating bar 90 has recesses to receive the outer ends of the bell cranks, and when this bar is moved in the direction of its arrow Fig. 10, all the pins 88 are pushed against the clamps and open the latter and release the threads. This action of the bar is coincident with the turning of the shaft 113, Fig. 3, to lift the distenders 1. As shown (see Fig. 1) a spring 91 is connected to one end of the bar 90 to move it in one direction, and the other end of the bar is connected by a link 92 (Figs. 2 and 3ª) with a catch lever 93, one arm of which extends through a slot $r$ (Fig. 3ª) in a plate 121 of the frame C, and into a slot in a blade 85 connected at its outer end with a bell crank 100, pivoted at 101 to the frame D, Figs. 2, 4 and 5, the long arm of the bell crank extending inward in position to be struck and lifted by the cam arm 30 on the shaft 51. The catch lever 93 has a shoulder for engaging the edge of the slot in the plate 121 (Fig. 3ª) when the said lever 93 is pushed inward, and this is effected by the inward swing of a pendent arm 86, suspended from the main frame (Fig. 3) and connected by a rod 81 to an arm on the shaft 113. If now the shaft 113 is rocked in the direction of its arrow Fig. 3 to retract the distenders, the arm 86 will swing in; its lower end by contact with the catch lever 93, Fig. 2, will carry the latter inward until its shoulder engages the slotted plate 121, thereby also drawing the bar 90 longitudinally in the direction of its arrow Fig. 2, and rocking the levers 89 to push in the pins 88 and open the clamps, releasing the ends of the threads. As the shaft 51 thereafter rotates, its cam 30 lifts the arm of the bell crank 100 and carries the connecting rod 85 to the left, Figs. 2, 4 and 5, and rocks the catch lever 93 until its shoulder escapes its engagement Fig. 3ª, when the lever will be carried outward by the pull of the spring 91 of the bar 90.

I have shown the distenders as consisting each of wire bent on itself and curved, the ends connected to a rock shaft 122 Fig. 3, carried by a swinging frame 106 pendent from a pivot 107 on the main frame. The shaft 122 carries a pinion 103 which gears with a pinion 104 carried by the frame 106 and gearing with a stationary carrier rack 105 connected with the main frame, and the frame 106 is connected by a link 108 with an arm 109 on the shaft 113 so that on rocking the latter in the direction of its arrow the frame 106 will swing out and the pinion 104 will turn as it travels on the rack, and will turn the pinion 103 so as not only to lift the distenders, but also carry them away from the thread carriers. After the skeins have been laced on the desired number of sides the carriage is withdrawn and the laced skeins removed and replaced by others to be operated on. As in practice the carriage is of considerable length and the sliding frame C correspondingly long, the upper and lower sections of said frame C must be supported or braced to prevent sagging, and I therefore pivot to one section (Figs. 13 and 14) an arm 130 with jaws to engage a pin 132 on the other section, thus maintaining them in relative position, and the arm has a handle 131 for swinging the arm out of the way when the carriage and its reel are being inserted and withdrawn.

As shown the frame C is supported on the main frame at one end, the bars of the extension D of the frame C having their bearings on the frame A, as shown in Fig. 8. At the other end the frame C has a connected rod 135 which slides in the hub of an arm 131 pendent from a bar 137 of the main frame. It will be evident that the particular mechanisms shown may be greatly modified without departing from the main features of my invention. Among other modifications the thread carriers or shuttles may have pointed ends as shown in Fig. 18, so as to penetrate the layers of yarn without the use of the distenders; or parts of the mass, as the parts $f$ $f$ $f$, Fig. 19, may be raised and the intervening parts $g$ $g$ remaining stationary or lowered for the passage of the thread carrier in one direction, and then the parts $f$ lowered and the parts $g$ raised for the passage of the carrier in the opposite direction. In both cases however the main result is the same, that is the lacing is passed above some and below other parts of the mass back and forth. It will further be seen that a longitudinal intermittent movement of the reel to cause the carrier to pass through the mass of yarn progressively at different points would be the equivalent of the like side movement of the thread carrier. The shaft of the distenders 1 carries short curved arms 150 which serve to keep separate the masses of the different skeins arranged side by side on the reels.

Without limiting myself to the special appliances set forth, I claim:

1. The within described improvement in apparatus for lacing skeins, the same consisting in means for passing a thread in one direction above separated parts of a skein and below intervening parts, and then carrying the same thread back in the other direction above the latter parts and below the other parts.

2. In a skein lacing apparatus the combination of a rack or frame supporting a distended skein, a thread carrier, and means for carrying the carrier progressively in one direction downward and upward through the skein until beyond the edge thereof and then progressively upward and downward in the opposite direction.

3. In a skein lacing apparatus the combination of a rack or frame supporting a distended skein, a thread carrier, and means for reciprocating the carrier vertically and for moving the carrier or skein relatively to present the mass of yarn at successively different points for the passage of the carrier first in one direction and then in the other.

4. In a skein lacing apparatus the combination of a reel for supporting the skein in a distended condition, a thread carrier, means for moving the carrier upward and downward through the yarn at one side of the skein, and means for also shifting the carrier intermittently in one direction to pass through the mass successively at different points and for then shifting it intermittently in the opposite direction.

5. The combination of a rotatable reel adapted to support the yarn of a skein in a distended form, guideways above and below the mass at one side, a thread carrier adapted to travel in said guideways across the plane of the yarn at that side, means for reciprocating the thread carrier in said ways, and means for imparting a lateral motion to the thread carrier after each vertical movement.

6. The combination of a rotatable reel adapted to support the yarn of a skein in a distended form, guideways above and below the mass at one side, a thread carrier adapted to travel in said guideways across the plane of the yarn at that side, means for reciprocating the thread carrier in said ways, means for imparting a lateral motion to the thread carrier after each vertical movement, and means for separating the yarn for the vertical passage of the thread carrier.

7. The combination of a rotatable reel adapted to support the yarn of a skein in a distended form, guideways above and below the mass at one side, a thread carrier adapted to travel in said guideways across the plane of the yarn at that side, means for reciprocating the thread carrier in said ways, means for imparting a lateral motion to the thread carrier after each vertical movement, and a yarn distender consisting of a series of horns, and means for carrying the same into and out of the mass of yarn.

8. The combination in a skein lacing apparatus of a reel for supporting a skein of yarn, a thread carrier, means whereby the carrier is caused to carry a thread across the mass of yarn at one side in opposite directions, above and below different parts of the mass, and a support on which the reel is rotatable to present different sides of the skein successively to the lacing means.

9. The combination of a reel, a thread carrier, guides for directing the carrier through a skein carried by the reel, a support for said guides, and means for moving said support step by step first in one direction and then in the other.

10. The combination of a reel, a thread carrier, guides for the same on the frame, means for reciprocating the thread carrier in said guides, racks connected with the frame, a rotatable pinion, and means for shifting the pinion into and out of gear with the racks alternately.

11. The combination in a skein lacing apparatus, of a frame, guides thereon, a thread carrier movable in said guides, racks connected with said frame, a driving pinion, and means for carrying it into gear with the racks alternately, and means for imparting an intermittent rotation to said pinion.

12. The combination in a skein lacing apparatus, of a frame, guides thereon, a thread carrier movable in said guides, racks connected with said frame, a driving pinion for engaging said racks alternately, and means for imparting an intermittent rotation in one direction to said pinion.

13. The combination in a skein lacing apparatus, of a frame, guides thereon, a thread carrier movable in said guides, racks connected with said frame, a driving pinion for engaging said racks alternately, a driving shaft, and gears constituting a Geneva stop, between the driving shaft and the driving pinion.

14. The combination in a skein lacing apparatus, of a frame, guides thereon, a thread carrier movable in said guides, racks connected with said frame, a driving pinion, means for imparting an intermittent rotation in one direction to said pinion, a swinging tongue supporting said pinion, and means for shifting the tongue as the frame reaches the limit of its travel in each direction.

15. The combination in a skein lacing apparatus, of a frame, guides thereon, a thread carrier movable in said guides, racks connected with said frame, a driving pinion, means for imparting an intermittent rotation in one direction to said pinion, a swinging tongue supporting said pinion, a bracket pivoted to said tongue, a shaft and cam thereon for lifting said bracket, a movable detent for the bracket, and contacts carried with the frame, and means for shifting said detent by the said contacts.

16. The combination in a skein lacing apparatus of a reel, a frame sliding parallel to the axis of the reel, guides on said frame, a shuttle carried by said guides and provided with a rack, gears for successively engaging said rack, and means for rotating the gears alternately in different directions.

17. The combination of the main frame, reel, reel carriage movable on said frame, a thread carrier frame and means for reciprocating it on the main frame, a thread carrier provided with a rack, shafts and pinions carried thereby for engaging said rack, sleeves in which said shafts slide to turn therewith, and means for turning said sleeves alternately in different directions.

18. The combination with a reel of a sliding frame, guide plates arranged on said frame in position to be one above and one below one side of a skein carried by the reel, and a guide on said frame above and below said plates, and a thread carrier movable in said guides and means for reciprocating the carrier.

19. The combination with a reel of a sliding frame, guide plates arranged on said frame in positions to be one above and one below one side of a skein carried by the reel, and a guide on said frame above and below said plates, and a thread carrier movable in said guides and means for reciprocating the carrier, a rotatable shaft and curved distending horns carried by said shaft.

20. The combination with a reel of a sliding frame, guide plates arranged on said frame in positions to be one above and one below one side of a skein carried by the reel, and a guide on said frame above and below said plates, a thread carrier movable in said guides, means for reciprocating the carrier, a rotatable shaft, a swinging support therefor, and curved distending horns carried by said shaft.

21. The combination with the thread carrier frame and reel of a rock shaft, a series of curved horns carried thereby, a swinging frame for said shaft, a pinion on the shaft, and a stationary curved rack engaged by said pinion.

In testimony whereof I affix my signature in presence of two witnesses.

CARL FERENBACH.

Witnesses:
HARRY V. HAFNER,
WILLIAM GARVNER.